United States Patent [19]
Fukuchi

[11] Patent Number: 6,128,451
[45] Date of Patent: *Oct. 3, 2000

[54] IMAGE FORMING APPARATUS HAVING DIGITAL IMAGE DATA SUPPLY DEVICE

[75] Inventor: Yutaka Fukuchi, Yokohama, Japan

[73] Assignee: Ricoh Co., Ltd., Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/937,164

[22] Filed: Sep. 25, 1997

[30] Foreign Application Priority Data

Sep. 25, 1996 [JP] Japan .................................. 8-252998
Nov. 11, 1996 [JP] Japan .................................. 8-298819
Jul. 10, 1997 [JP] Japan .................................. 9-185502

[51] Int. Cl.[7] ........................................ G03G 15/00

[52] U.S. Cl. .................................... 399/75; 399/167

[58] Field of Search ................... 399/75, 155, 121, 399/167, 174, 170, 297, 312, 83, 49, 36

[56] References Cited

U.S. PATENT DOCUMENTS 4,699,501 10/1987 Watanabe et al. .................... 399/83
5,111,242  5/1992 Tanimoto et al. .................... 399/167
5,689,764 11/1997 Fukuchi et al. .

FOREIGN PATENT DOCUMENTS 5-260229 10/1993 Japan .
6-332564 12/1994 Japan .
8-149680  6/1996 Japan .

*Primary Examiner*—Thomas D. Lee
*Assistant Examiner*—Stephen Brinich
*Attorney, Agent, or Firm*—Oblon, Spivak, McClelland, Maier & Neustadt, P.C.

[57] ABSTRACT

An image forming apparatus has a driven image forming part for forming an image. A data supply device has at least one moving portion for supplying data to the image forming apparatus. For example, it may be a hard disk device or a toner sensor having an oscillator, both of which generate noise. A controller actuates the data supply device only during operation of the image forming part, and so the noise is not bothersome to the user.

30 Claims, 7 Drawing Sheets

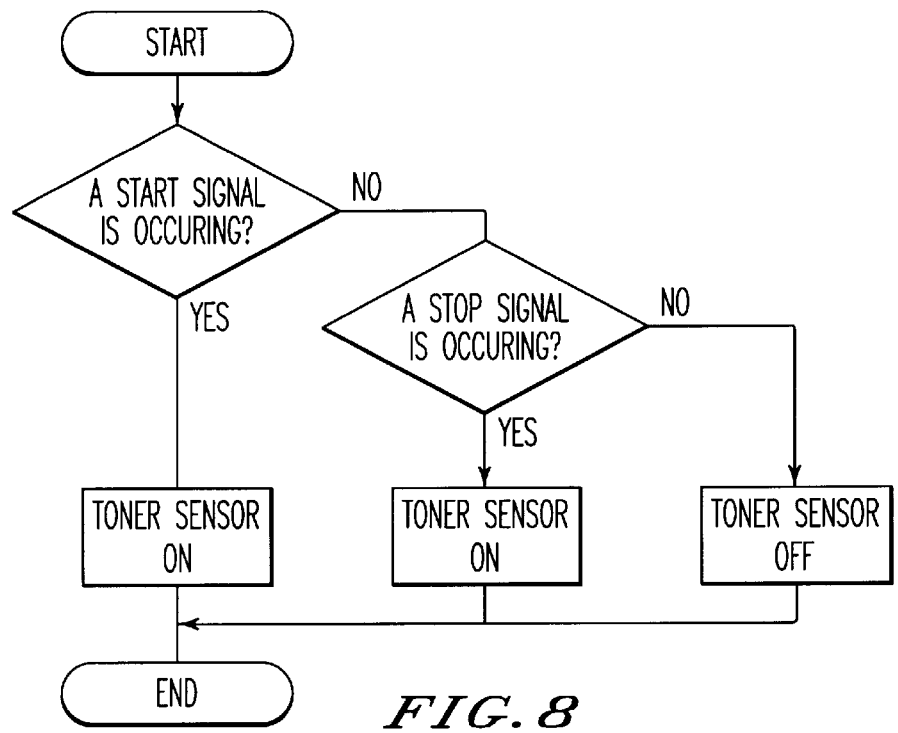
FIG. 8
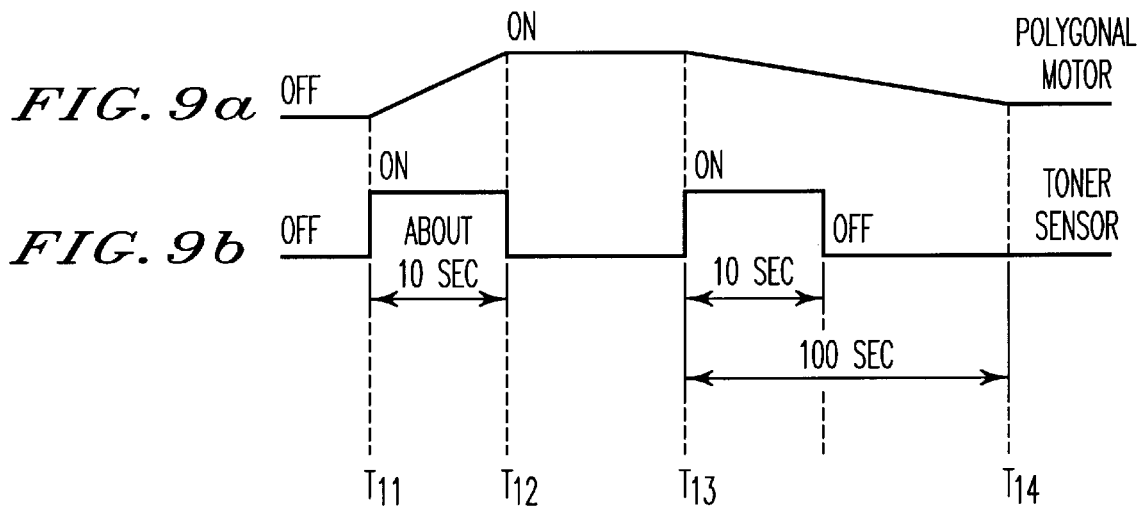
FIG. 9a
FIG. 9b
FIG. 5a
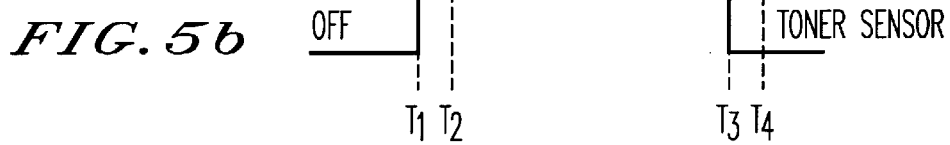
FIG. 5b

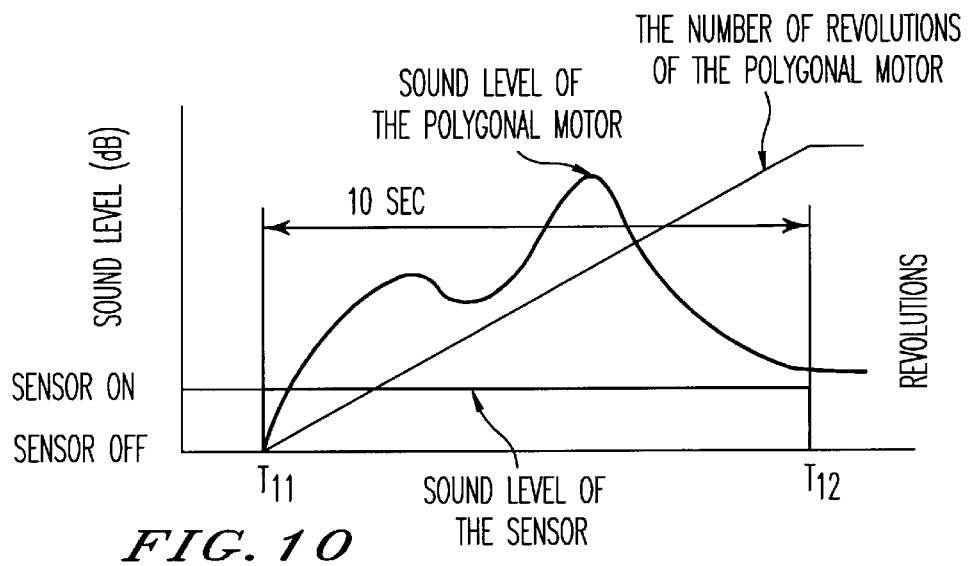
FIG. 10
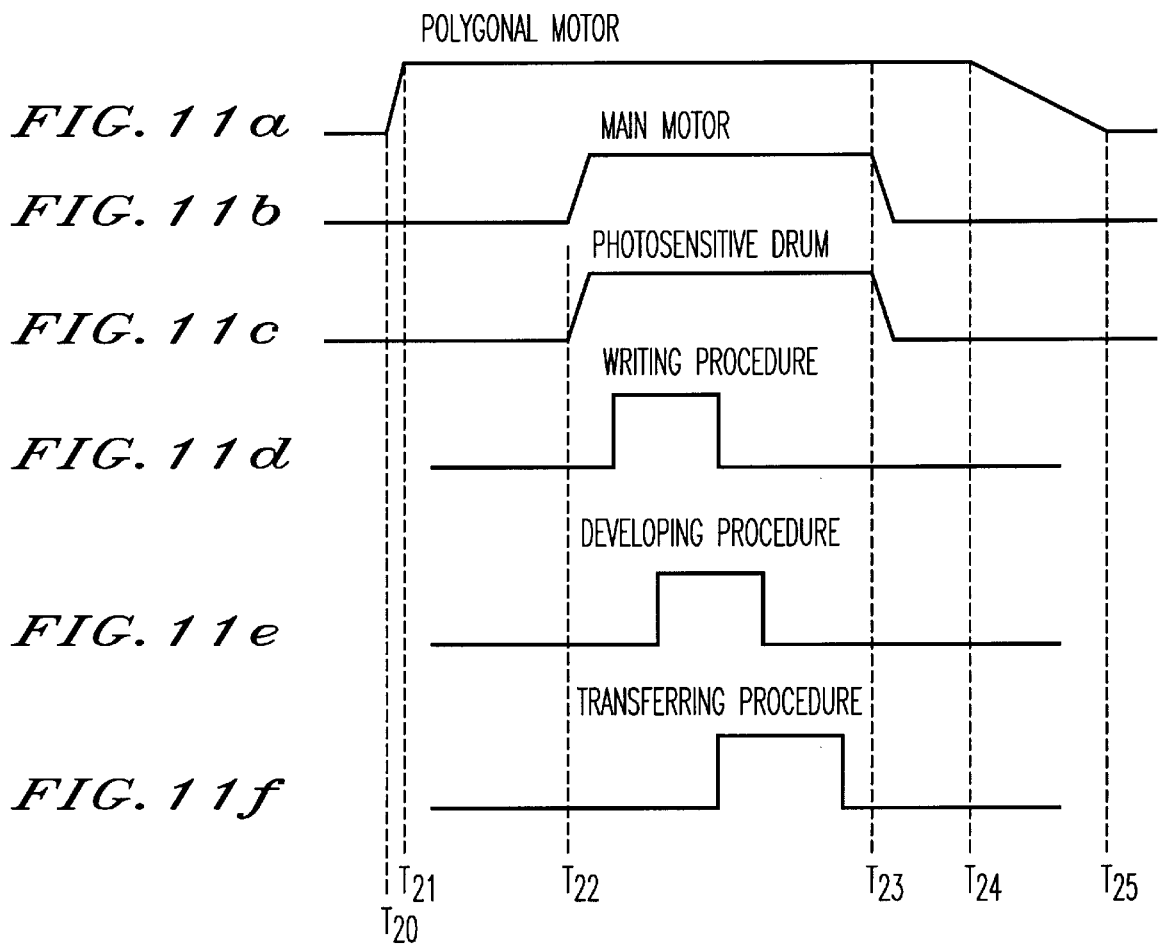
FIG. 11a
FIG. 11b
FIG. 11c
FIG. 11d
FIG. 11e
FIG. 11f

IMAGE FORMING APPARATUS HAVING DIGITAL IMAGE DATA SUPPLY DEVICE

BACKGROUND OF THE INVENTION

1. Field of the Invention

The present invention generally relates to an image forming apparatus such a copying machine, printing machine or facsimile machine, and more particularly to an image forming apparatus having reduced noise.

2. Description of the Related Art

It is generally known to provide an image forming apparatus such a copying machine with a mass storage device, e.g., a hard disk device or a magneto-optic disk device having a driving means such a motor for memorizing and/or reading digital signals. The driving means in such an apparatus operates continuously so as to avoid the need to reboot, even though the apparatus is out of operation. However, the driving speed of the motor for the mass storage device must be high in order to achieve an adequate data reading speed, resulting in a loud noise which is objectionable to users.

In addition, it is generally known that at least two kinds of sensors can be used in the image forming apparatus. One, generally called a photo sensor, is generally present in a sheet feeding section to detect the presence of a sheet by use of light reflected from the sheet, or in a reading section to detect the size of the original by use of light reflected from the original.

The other, generally called a digital sensor, as shown in FIG. 1, includes a clock pulse oscillator 31 such a crystal oscillator, a vibrator 32 and sensing film 33, and is generally present in a developing device, toner hopper or waste toner container in order to detect the toner quantity or toner density therein. The clock pulse oscillator 31 issues a clock pulse at several tens of kHz, which vibrates the vibrator 32 and the film 33. As the oscillation frequency of the film 33 changes with a change in the amount of toner facing the film, the sensor is able to detect the amount of toner in the device. But the vibrator 32 resonates the sensor base at a frequency of about 6 kHz, which causes the sensor casing to resonate at about 1 to 2 kHz and produce a 35 dB noise.

Noise of this level occurring intermittently and for a long time hinders users from doing their work. However, the conventional image forming apparatus does not take measures against such noise, so that being around the image forming apparatus becomes unpleasant.

SUMMARY OF THE INVENTION

It is an object of the present invention to provide an image forming apparatus which creates less of a disturbance to the user.

It is another object of the present invention to provide an image forming apparatus which produces less noise.

According to one feature of the invention, the above and other objects are achieved by providing an image forming apparatus having an image forming part for forming a image, a driving means for driving said image forming part, a data supply device having at least one moving portion for supplying data to said image forming apparatus, and control means for actuating said data supply device only during operation of said driving means.

According to another feature of the invention, the above and other objects are achieved by providing an image forming apparatus having an image forming part for forming an image and an image writing device for writing an image to said image forming part, comprising driving means for driving said image writing device, a data supply device having at least one moving portion for supplying data to said image forming apparatus, and control means for actuating said data supply device only during operation of said driving means.

According to yet another feature of the invention, the above and other objects are achieved by providing an image forming apparatus comprising an image forming part for forming a image, said image forming part having a photosensitive portion for forming a latent image thereon, driving means for driving said photosensitive portion, a data supply device having at least one moving portion for supplying data to said image forming apparatus, and control means for actuating said data supply device only during operation of said driving means.

According to yet another feature of the invention, the above and other objects are achieved by providing an image forming apparatus having an image forming part for forming an image and an image writing device for writing an image to said image forming part, comprising first driving means for driving said image forming part, second driving means for driving said image writing device, a data supply device having at least one moving portion for supplying data to said image forming apparatus, and control means for operating said data supply device only during a time period from when said second driving means begins driving to when said first driving means begins driving.

According to yet another feature of the invention, the above and other objects are achieved by providing an image forming apparatus having an image forming part having a photosensitive medium for forming an image and an image writing device for writing a latent image to said photosensitive medium, comprising first driving means for driving said image forming part, second driving means for driving said image writing device, a data supply device having at least one moving portion for supplying data to said image forming apparatus, and control means for actuating said data supply device within a time period from when said second driving means begins driving when to said image writing device begins writing.

According to yet another feature of the invention, the above and other objects are achieved by providing an image forming part for forming an image and an image writing device for writing a latent image to said image forming part, comprising a photosensitive device comprised in said image forming part and holding the latent image thereon, a developing device comprised in said image forming part for adhering the latent image with toner, a transferring device comprised in said image forming part for transferring the toner to a recording medium, a first driving means for driving said image-forming part, a second driving means for driving said image writing device, a data supply device having at least one moving portion for supplying data to said image forming apparatus, and control means for actuating said data supply device within a time period from when said transferring device finishes transferring to when said second driving means fully stops.

BRIEF DESCRIPTION OF THE DRAWINGS

The above and other objects and novel feature of the invention will more fully appear from the following detailed description when the same is read in connection with the accompanying drawing. It is to be expressly understood, however, that the drawing is for purpose of illustration only and is not intended as a definition of the limits of the invention.

FIG. 5 is a timing chart based on the embodiment of FIG. 3;

FIGS. 7 and 8 are flow charts based on the embodiment of FIG. 6;

FIG. 9 is a timing chart based on the embodiment of FIG. 6;

FIG. 10 is a graph comparing the sound level of the polygonal mirror motor to that of the sensor over a number of mirror revolutions;

FIG. 11 is a timing chart for an operational sequence; and

DETAILED DESCRIPTION OF THE PREFERRED EMBODIMENTS

Figure 1:
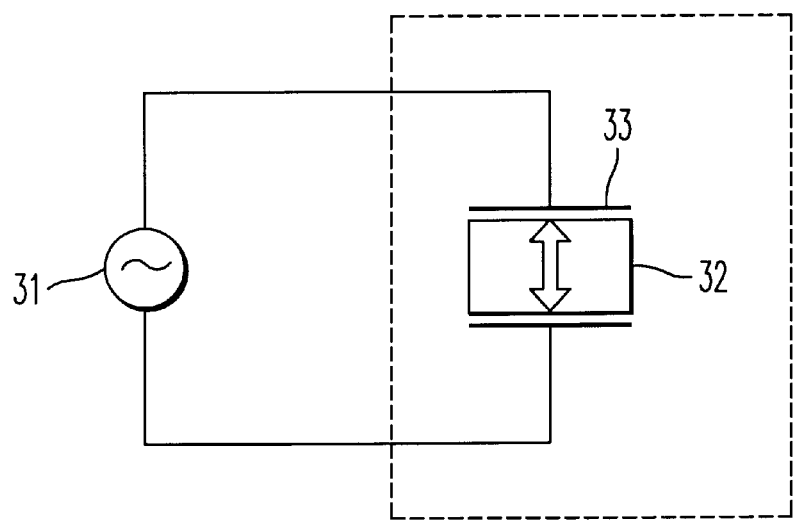
FIG. 1 schematically shows a conventional digital sensor including clock pulse oscillator.
Figure 2:
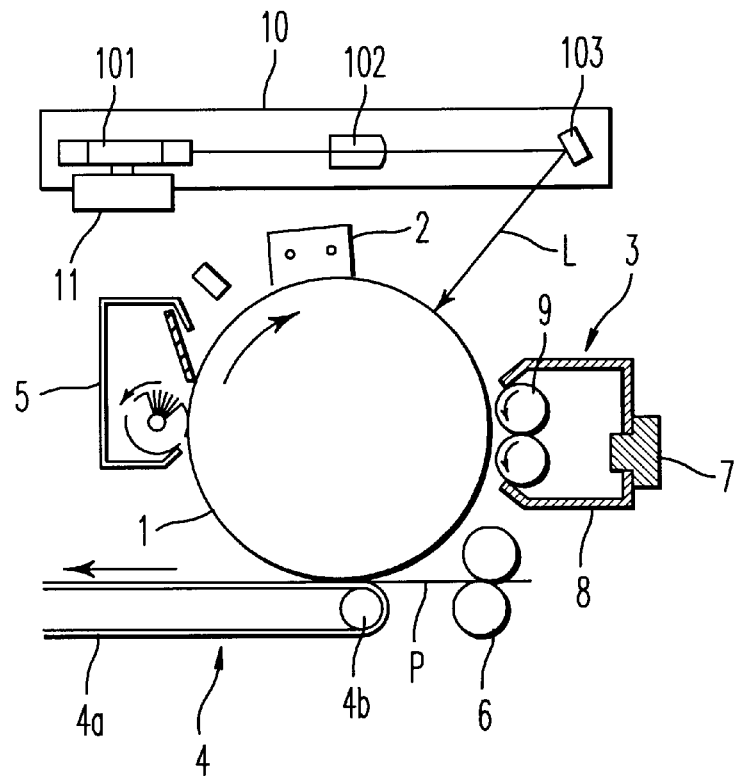
FIG. 2 is a schematic view of a typical image forming apparatus to which the present invention may be applied.

A description will now be given of first embodiment of this invention. In FIG. 2, a laser-beam printer according to the present invention has a photosensitive drum 1 successively surrounded by a charger device 2, a developing device 3, a transferring device 4 having a feeding belt 4a mounted on a roller 4b, a toner cleaning device 5, and an optical image writing device 10 disposed above these devices.

The optical image writing device 10 includes a lens 102, a mirror 103 and a polygonal mirror 101 driven by a driving motor 11 arranged underneath the polygonal mirror 101. The optical image writing device 10 produces a laser-beam L according to an image transmitted from various devices, e.g., a scanning device (not shown), a host computer (not shown) or a hard disk device (not shown).

In a device having such a construction, a printing paper P as a recording medium is supplied from a paper supply box (not shown) and is conveyed toward the transferring device 4, for example using advancing rollers 6. The outer peripheral surface of the photosensitive drum 1 rotates in synchronization with the movement of the printing paper P. Residual toner is removed by the toner cleaning device 5 and the drum is uniformly electrified by the charger device 2. An electrostatic latent image is formed on the outer surface of the drum 1 by laser beam L produced by the optical image writing device 10, is developed with the developing device 3 and an image consisting essentially of toner is formed.

The image formed on the outer peripheral surface of the photosensitive drum 1 is successively transferred by the transfer voltage of the transferring device 4 onto the surface of the printing paper P. Next, the printing paper P is conveyed by the feeding belt 4a from the transfer portion toward a fixing portion where the transferred image is fixed by a fixing device (not shown) and is discharged from a discharge portion (not shown). Thus the printing operation is completed and the printer goes into a standby mode.

The developing device 3 has a tank 8 for accommodating toner. Developing rollers 9 supply toner from the tank 8 to the drum 1. A toner sensor 7 including a crystal oscillator is mounted for sensing the amount of toner remaining in the tank 8.

Figure 3:
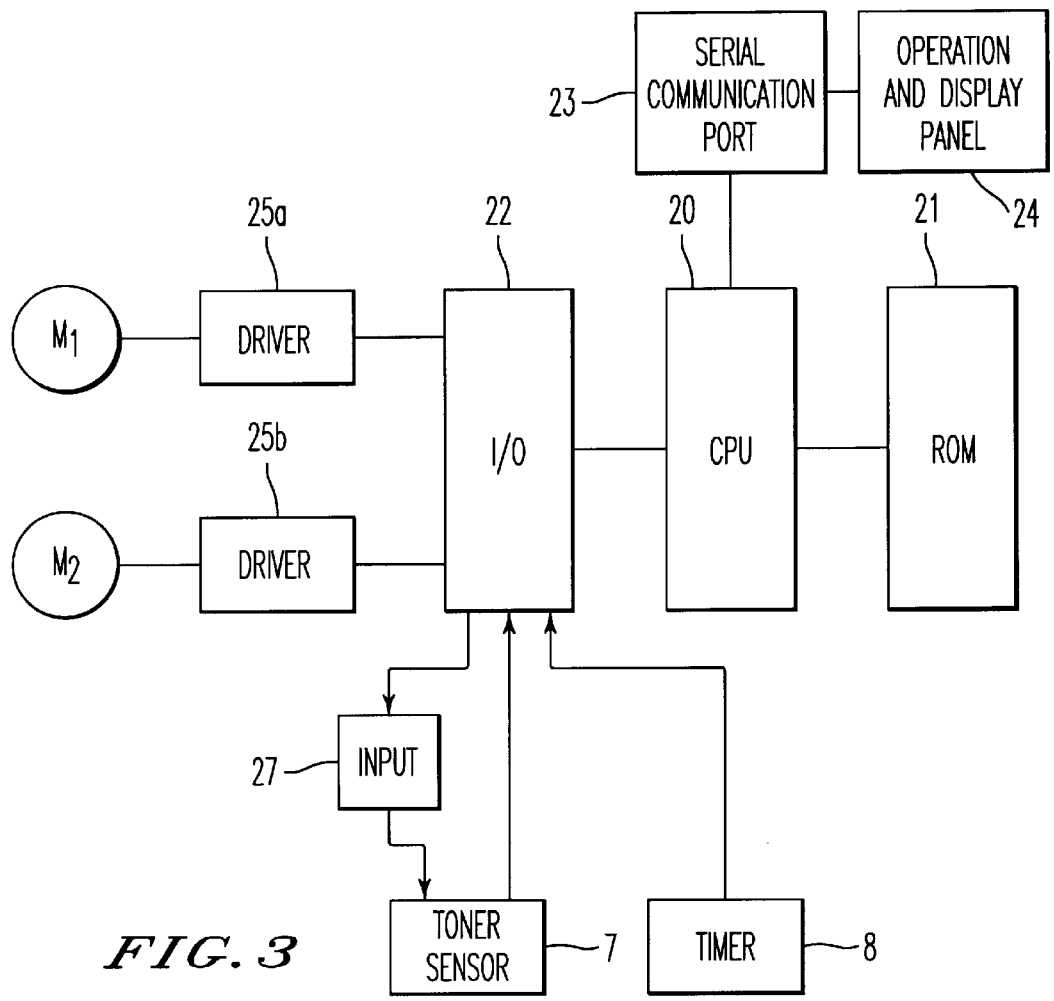
FIG. 3 is a schematic block diagram of a first embodiment of a control system according to the invention.

Referring to FIG. 3, a control system for executing the above control will be described. The system has a CPU (Central Processing Unit) 20 for controlling the entire copier, a ROM (Read Only Memory) 21 storing a control program, an I/O (Input/Output) 22 for interfacing various electrical constituents to the CPU 20, an operation and display panel 24 for entering a copying operation and interfacing the copier to the operator, and a serial communication port 23 interconnecting the panel 24 and the CPU 20. The toner sensor 7 is connected to the input port of the I/O 22 for transferring information of the amount of the toner to the CPU 20, and is connected to the output port of the I/O 22 via a switching device 27 consisting of a transistor for driving (apply power to) the sensor 7. A main motor driver 25a for rotating a main motor M1 which drives the photosensitive drum 1, developing rollers 9 and the transferring device 4, is connected to the output port of the I/O 22, and a hard disk motor driver 25b for rotating hard disk driving motor M2 is connected to the output port of the I/O 22. On receiving a print signal for performing a printing operation from the operation and display panel 24, the CPU 20 begins the control sequence according to the program stored in the ROM 21.

Figure 4:
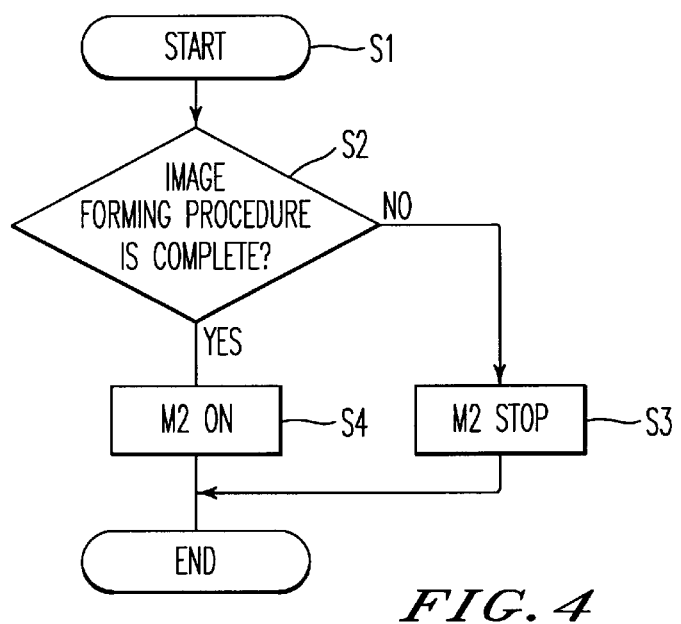
FIG. 4 is a flow chart based on the embodiment of FIG. 3.

Referring to FIG. 4, a control flow of the CPU 20 will be described in regard to the hard disk device. In a first step S1, the hard disk device operates according to a printing operation so as to read an image to be printed memorized in the hard disk device. The completion of the printing operation is tested for in step S2. When the image forming procedure, for example a printing operation, is determined to be completed (step S3), the hard disk motor driver 25b stops rotation of the hard disk motor M2. If the image forming procedure is not determined to be completed (step S4), the hard disk motor M2 remains rotating. According to this embodiment, since the hard disk device works (detects or reads image data to be supplied) only during the printing operation, the hard disk driving motor M2 does not cause noise before and after printing.

During printing, the hard disk driving motor M2 makes noise, but the main motor M1 or other devices operate (with vibrations at 100–200 Hz) to make noise at about 65 dB. Therefore, the user does not become aware of the 35 dB noise from the toner sensor or the hard disk device. Further, while this embodiment was described as using a hard disk device as the image data supply device, the invention is also applicable for use with a magneto-optic disc, a floppy disk device or a cassette or video tape recorder as the image data supply device.

Figure 7:
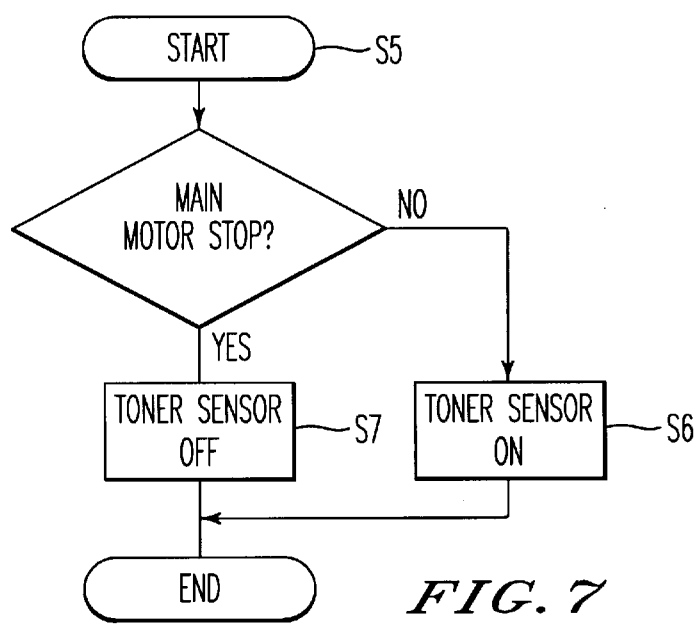

Referring to FIGS. 5 and 7, a description will now be given of a second embodiment of this invention. Basic components of this embodiment are similar to the previous embodiment in FIGS. 2 and 3, so a description thereof will be omitted. Therefore, this embodiment will be described with particular emphasis on a relation between the toner sensor and a main motor.

Referring to FIG. 7, a control flow of the CPU 20 will be described in regard to the toner sensor 7. The toner sensor 7 including a crystal oscillator begins to sense the amount of toner remaining in the tank 8 in accordance with the beginning of rotation of the main motor M1 (step S5). In other words, the CPU 20 switches the switching device 27 into conduction so that the toner sensor 7 transmits sampling data to the CPU 20 and the contents of the data are indicated on the operation and display panel 24. If the main motor M1 is rotating, the toner sensor 7 keeps sensing (step S6), and if the main motor M1 is not rotating, the toner sensor 7 stops sensing (step S7). The last sampling datum sensed and transmitted just before the main motor M1 stops is kept in the CPU 20 and the content of the datum is retained until the main motor M1 moves the next time.

Now, referring to FIG. 5, the timing relation between the main motor M1 and the toner sensor 7 will be described. In FIG. 5(a), the x-direction indicates time and the y-direction indicates rotational speed of the main motor M1. In FIG. 5(b), the x-direction is the same as in FIG. 5(a) and the y-direction indicates the state of conduction of the toner sensor 7.

When the main motor M1 begins rotating at time T1, the toner sensor 7 begins sensing. Then the main motor M1 drives the above-mentioned devices to perform a printing operation after the rotation of the main motor M1 becomes stable at T2. After completion of the printing operation, the main motor M1 begins to stop rotating under the command of the CPU 20 to the motor driver 25a. Simultaneously, the CPU 20 commands the switching device 27 to switch the toner sensor 7 out of conduction at T3. Subsequently, the main motor M1 stops at T4. Since the toner sensor works only during the rotation of the main motor M1, which makes noise at about 65 dB and 100–200 Hz, the toner sensor does not cause noise during halts of the main motor M1.

Figure 6:
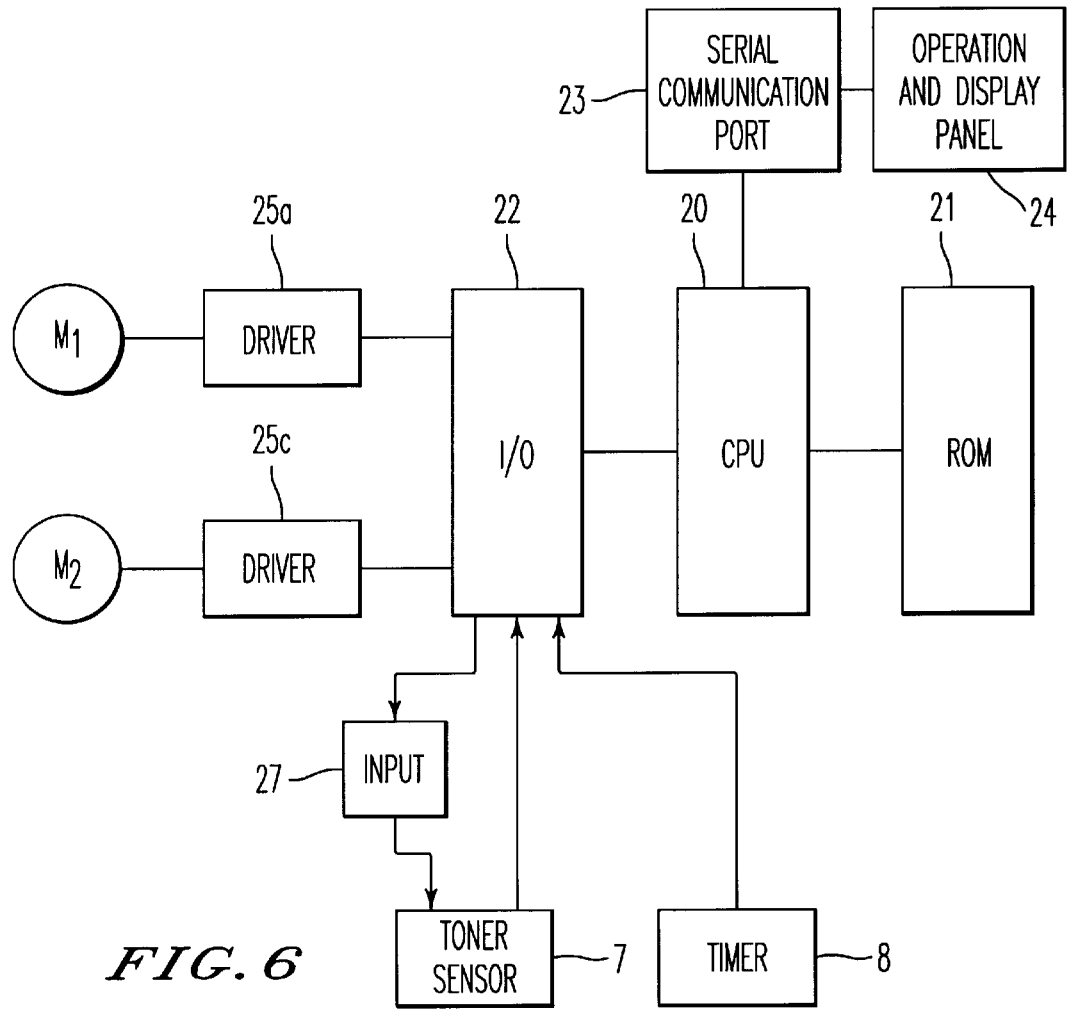
FIG. 6 is a schematic block diagram of a second embodiment of a control system according to the invention.

Referring to FIGS. 6, 8 and 9, a description will now be given of a third embodiment of this invention. As shown in FIG. 6, basic components of this embodiment are similar to the previous embodiment in FIGS. 2 and 3 except that a third motor driver 25c for rotating the polygonal motor 11 (M3) is connected to the output port of the I/O 22. Therefore, this embodiment will be described with particular emphasis on a relation between the toner sensor and polygonal mirror.

In FIG. 9(a), the x-direction indicates time and the y-direction indicates rotational speed of the polygonal motor 11. In FIG. 9(b), the x-direction is the same as in FIG. 9(a) and the y-direction indicates a state of conduction of the toner sensor 7.

The CPU 20 sends a start signal to the polygonal motor driver 25c to boot up the polygonal motor M3 at T11, and the signal is maintained for about 10 seconds. The CPU 20 switches the switching device 27 into conduction during a period for which the signal is maintained (T11 to T12). Afterward, the CPU 20 sends a stop signal to the polygonal motor driver 25c to stop rotating the polygonal motor M3 at T13, and the signal is maintained for about 10 seconds. Then the CPU 20 switches the switching device 27 into conduction during a period for which the signal is maintained (T13 to T14). The last sampling datum sensed and transported before the polygonal motor M3 stops is kept in the CPU 20 and the content of the datum is retained until the polygonal motor M3 moves the next time.

A polygonal motor in general needs about 10 seconds before the rotation of the motor becomes stable (as shown in FIG. 9(a) at T11–T12) and about 100 seconds before it stops (as shown in FIG. 6(a) at T13–T15). The polygonal motor produces a 50 dB resonance at 600–900 Hz before image writing when the rotation thereof is unstable.

FIG. 10 shows the relation between the number of the revolutions of the polygonal motor 25c and the intensity (in dB) of sounds emanating from toner sensor 7 and the polygonal motor 25c in this embodiment. As the sound emanating from the image writing device is louder than the sound emanating from toner sensor, especially before the rotation of the motor becomes stable, the user is not aware of the sound emanating from the toner sensor 7. This phenomenon is true for almost all of the period during which the polygonal motor 25c rotates.

In this embodiment, although the movement of the toner sensor 7 is related to the movement of the polygonal motor 25c, the movement of the toner sensor 7 may instead be related to the movement of any other rotating device causing resonance, for example a photosensitive drum 1 having a control system which controls the rotational speed of the photosensitive drum to be gradual at the beginning or end of rotation in order to prevent gear damage and the scatter of toner.

Referring to FIG. 11, description will now be given of a fourth embodiment of this invention. Basic components of this embodiment are similar to the previous embodiment in FIGS. 2 and 6 except for an addition of a forecasting means. Therefore, this embodiment will be described with particular emphasis on a relation between the toner sensor, the forecast means and the polygonal motor.

FIG. 11 shows the timing between the polygonal motor 11, the main motor M1, the photosensitive drum 1, a charging process, a developing process and a transferring process. The forecasting means forecasts movement of the image forming apparatus in advance and switches the apparatus from a standby mode to a pre-active mode; for example it may be an operator detector including a photo sensor sensing movement when the user approach the apparatus, or a key detector detecting when any key on the panel 24 is pushed.

Upon entering the pre-active mode (in response to the forecasting means), the polygonal motor begins to rotate (at T20) and the toner sensor begins sensing for a predetermined period. Then after 3–10 seconds, the rotation of the polygonal motor becomes stable at T21.

Afterward, when the CPU 20 detects a signal for beginning a printing operation, the apparatus is put into an active mode and the main motor M1 and the photosensitive drum 1 begin rotating at T22, while the toner sensor stops sensing. Then the charging process, the developing process and the transferring process are successively performed. After the printing operation is performed, the apparatus is put into a standby mode at T23. Furthermore, when a predetermined period has elapsed, the polygonal motor begins to stop (at T24), and stops fully at T25 after 30–120 seconds.

When the polygonal mirror motor M3 begins stopping, the toner sensor 7 again begins sensing for a predetermined period. In such an embodiment, since the toner sensor functions only before and after the printing operation, the toner sensor can exactly sense the amount of toner in the tank 8. Further, since the toner sensor starts sensing before the next printing operation, if the toner sensor senses an absence or shortage of toner before the next printing operation, the user can know it before printing begins. Moreover, as the toner sensor senses within a period for which the polygonal motor rotates, particularly rotates unstably, the user is not aware of the sound from the toner sensor.

Furthermore, in this embodiment, as the toner sensor 7 stops sensing during the printing operation, there is no worry that the vibration of the toner sensor causes a disturbance to the image on the photosensitive drum during a printing operation, i.e., from the charging process to the transferring process. From this viewpoint, the toner sensor 7 may continue sensing until just before the charging process, and recommence after the transferring process.

Figure 12:
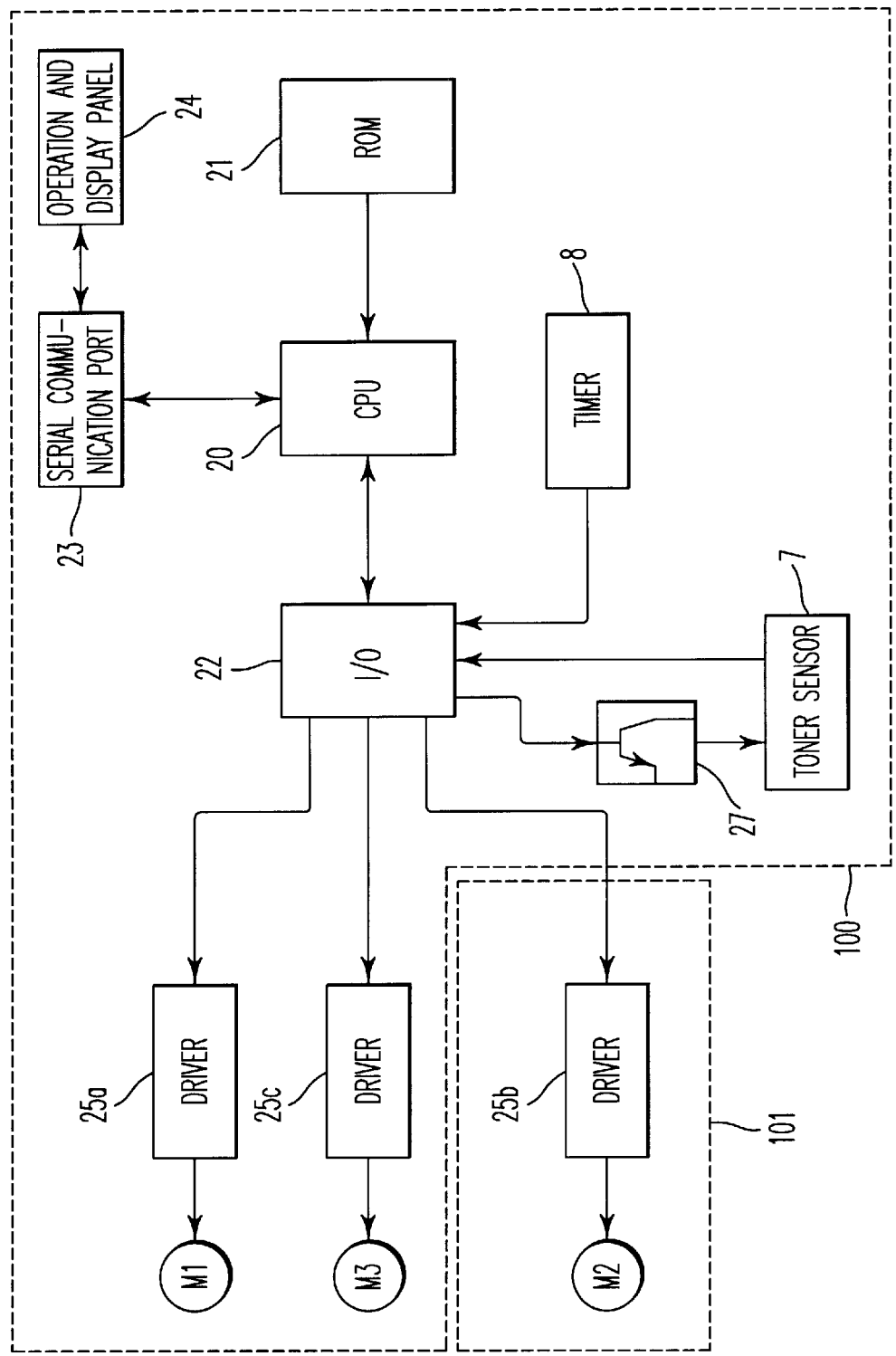
FIGS. 12 and 13 are schematic block diagrams of additional embodiments of a control system according to the invention.

Referring to FIG. 12, a description will now be given of a fifth embodiment of this invention. Basic components of this embodiment are similar to the previous embodiments in FIGS. 3 and 6 except that a hard disk device 101 including a second motor driver 25b for rotating the hard disk driving motor M2 is connected to the output port of the I/O 22, and is separate from the main body 100.

In this embodiment, as in the above-mentioned embodiments, when a printing operation or image forming procedure is completed and the machine goes into a stand-by mode, the CPU 20 causes the hard disk driver 25b to stop driving. Therefore, since the hard disk device 101 works (detects or reads and supplies image data) only during the printing operation, the hard disk driving motor M2 does not create noise before and after printing. Also, while the hard disk driving motor M2 creates noise during printing, the main motor M1 or other devices operate (and vibrate at 100–200 Hz) at about 65 dB, which is louder than the sound of the hard disk device. Thus the user does not become aware of the noise from the toner sensor or the hard disk device.

While this embodiment was described with reference to a hard disk device 101 as the image data supply device, it is also applicable to other external devices, e.g., a magneto-optic disc, a floppy disk device, a CD-ROM, DVD (Digital Video Disk) or a cassette or video tape recorder including a driving means as the image data supply device.

Figure 13:
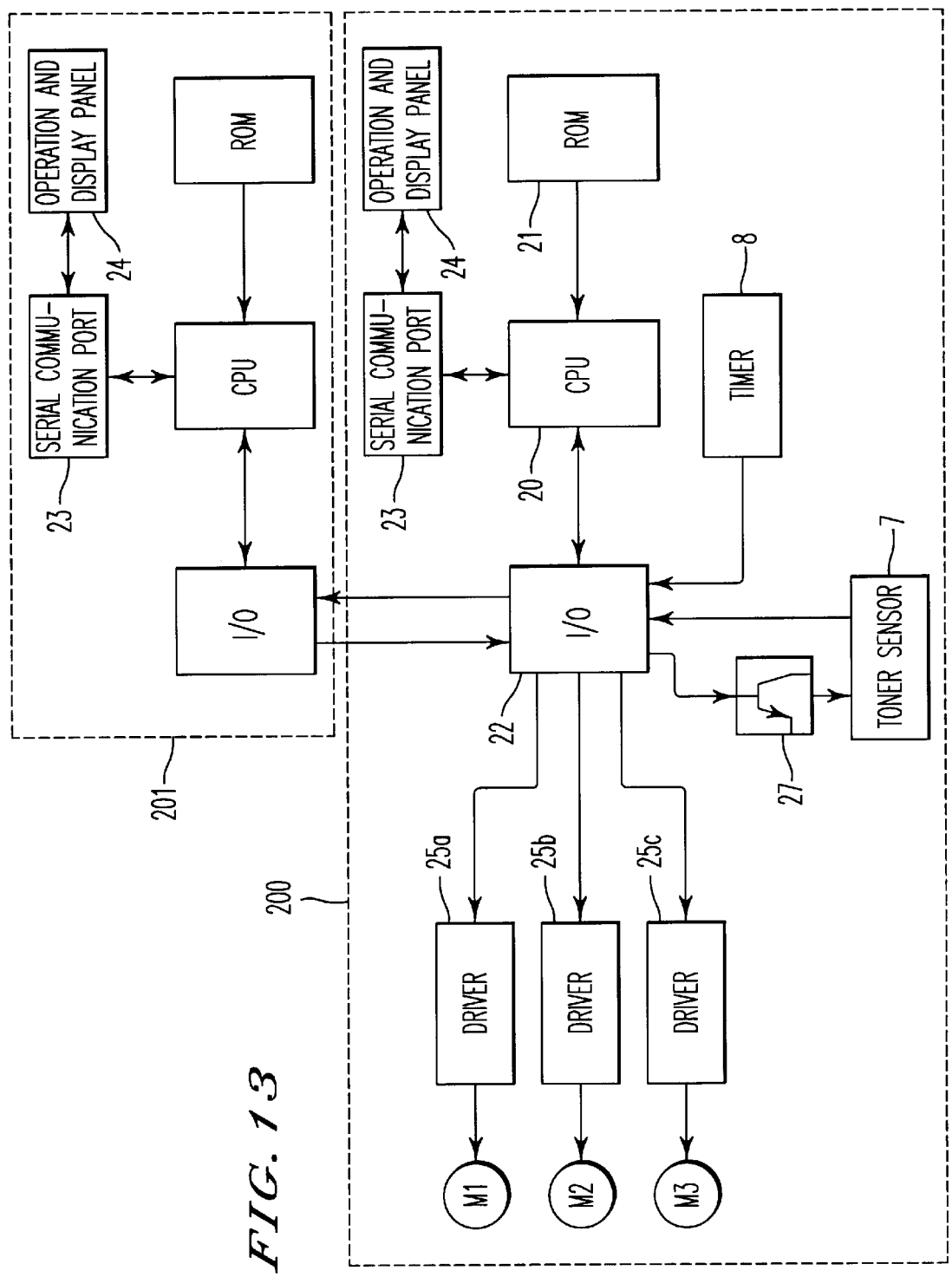

Referring to FIG. 13, a description will now be given of a sixth embodiment of this invention. Basic components of this embodiment are similar to the previous embodiment in FIG. 12. As shown in FIG. 13, an image-forming apparatus 200 is connected with a host computer 201 by a cable or communication network, etc., the image forming apparatus 200 including a toner sensor 7 or hard disk device as an image data supply device for supplying image information depending on movement of the moving portion. The CPU 30 operates the image data supply device to supply image data or control the image forming apparatus 200 on the basis of the information. The image forming apparatus itself is controlled as in the above-mentioned embodiments.

The host computer 201 intermittently requests the image forming apparatus 200 to check a status thereof, e.g., whether the apparatus is performing a printing operation or not, and the apparatus 200 answers the host 201. If the apparatus 200 is performing a printing operation, the host 201 operates the image data supply device to supply image data. If the apparatus is not performing a printing operation, it first initiates an image forming procedure, that is, it causes the motors M1 and M3 to begin operating, then operates the image data supply device to supply data. In this embodiment, as the image data supply device works only during the printing operation, the user does not become aware of noise from the image data supply device.

The image forming apparatus generally is placed near the user. Therefore, the user near the image forming apparatus may become startled if the apparatus begins to operate under the command of a host computer 201 in another area or another room. For this reason, in a preferable embodiment, the host 201 operates the image data supply device to supply data only when the apparatus is in a printing operation. Otherwise the host 201 prohibits the image data supply device from operating or puts the image data supply device into a stand-by mode. When in the stand-by mode, the host periodically checks for the presence of a printing operation. Therefore the user will not become startled. Furthermore, since the image data supply device does not work while the image forming apparatus stops, likewise the image forming device will not be cycled in response to operation of the image data supply device and so the longevity of parts of the image forming apparatus or image data supply device increases.

Of course, this operation prevention technique is applicable to any other part of the image forming apparatus which makes noise which could startle a user.

In these embodiments, the digital sensor is in the developing device. However the present invention is not limited only to the present embodiments and so the sensor could be in the toner hopper, toner container or waste toner container. Likewise, other oscillators could be used. Further, the operation and display panel, the scanning device or the forecasting means may be placed apart from the image forming apparatus.

The present invention is not limited to the specifically disclosed embodiments, and variations and modifications may be made without departing from the scope of the present invention.

The present invention is based on Japanese patent application 8-252998, filed on Sep. 25, 1996, the contents of which are incorporated herein by reference.

What is claimed as new and desired to be secured by Letters Patent of the United States is:

1. An image forming apparatus having an image forming part for forming an image, comprising:

driving means for driving said image forming part;

a data supply device having at least one vibrator for supplying data to said image forming apparatus; and control means for actuating said data supply device only during operation of said driving means.

2. The image forming apparatus of claim 1 wherein said data supply device is a hard disk device.

3. The image forming apparatus of claim 1 wherein said data supply device is a toner sensor having an oscillator.

4. The image forming apparatus of claim 1 wherein said driving means generates noise having an amplitude of about 65 dB during operation thereof, and said data supply device generates noise having an amplitude of less than about 65 dB during operation thereof.

5. An image forming apparatus having an image forming part for forming an image and an image writing device for writing an image to said image forming part, comprising:

driving means for driving said image writing device;

a data supply device having at least one vibrator for supplying data to said image forming apparatus; and control means for actuating said data supply device only during operation of said driving means.

6. An image forming apparatus as claimed in claim 5, wherein said driving means drives said image writing device with instability during at least a part of the operation of said driving means, and wherein said control means comprises means for actuating said data supply device only while said driving means is driving with instability.

7. An image forming apparatus as claimed in claim 6, wherein said driving means comprises a driving motor and said data supply device operates for a time period from when the driving motor begins to rotate to when the driving motor rotates with stability.

8. An image forming apparatus as claimed in claim 6, wherein said driving means comprises a driving motor and said data supply device operates for a time period from when the driving motor begins to stop rotating to when the driving motor fully stops.

9. The image forming apparatus of claim 5 wherein said data supply device is a hard disk device.

10. The image forming apparatus of claim 5 wherein said data supply device is a toner sensor having an oscillator.

11. The image forming apparatus of claim 5 wherein said driving means generates noise having an amplitude of about 65 dB during operation thereof, and said data supply device generates noise having an amplitude of less than about 65 dB during operation thereof.

12. An image forming apparatus comprising:
   an image forming part for forming a image, said image forming part having a photosensitive portion for forming a latent image thereon;
   a developing device for developing said latent image;
   driving means for driving said photosensitive portion;
   a sensor having at least one vibrator wherein an object wherein an object regarding a developing condition is sensed by using vibrations of the vibrator; and
   control means for actuating said sensor only during operation of said driving means.

13. An image forming apparatus as claimed in claim 12, wherein said driving means drives said photosensitive portion with instability during at least a part of the operation of said driving means, and wherein said control means comprises means for actuating said data supply device only while said driving means is driving with instability.

14. An image forming apparatus as claimed in claim 13, wherein said driving means comprises a driving motor and said data supply device operates for a time period from when the driving motor begins to rotate to when the driving motor rotates with stability.

15. An image forming apparatus as claimed in claim 13, wherein said driving means comprises a driving motor and said data supply device operates for a time period from when the driving motor begins to stop rotating to when the driving motor fully stops.

16. The image forming apparatus of claim 12 wherein said data supply device is a hard disk device.

17. The image forming apparatus of claim 12 wherein said data supply device is a toner sensor having an oscillator.

18. The image forming apparatus of claim 12 wherein said driving means generates noise having an amplitude of about 65 dB during operation thereof, and said data supply device generates noise having an amplitude of less than about 65 dB during operation thereof.

19. An image forming apparatus having an image forming part for forming an image and an image writing device for writing an image to said image forming part, comprising:
   first driving means for driving said image forming part;
   second driving means for driving said image writing device;
   a data supply device having at least one vibrator for supplying data to said image forming apparatus; and
   control means for operating said data supply device only during a time period from when said second driving means begins driving to when said first driving means begins driving.

20. The image forming apparatus of claim 19 wherein said data supply device is a hard disk device.

21. The image forming apparatus of claim 19 wherein said data supply device is a toner sensor having an oscillator.

22. The image forming apparatus of claim 19 wherein one of said first and second driving means generates noise having an amplitude of about 65 dB during operation thereof, and said data supply device generates noise having an amplitude of less than about 65 dB during operation thereof.

23. An image forming apparatus having an image forming part having a photosensitive medium for forming an image and an image writing device for writing a latent image to said photosensitive medium, comprising:
   first driving means for driving said image forming part;
   second driving means for driving said image writing device;
   a sensor having at least one vibrator wherein an object wherein an object regarding a developing condition is sensed by using vibrations of the vibrator; and
   control means for actuating said sensor within a time period from when said second driving means begins driving when to said image writing device begins writing.

24. The image forming apparatus of claim 23 wherein said data supply device is a hard disk device.

25. The image forming apparatus of claim 23 wherein said data supply device is a toner sensor having an oscillator.

26. The image forming apparatus of claim 23 wherein one of said first and second driving means generates noise having an amplitude of about 65 dB during operation thereof, and said data supply device generates noise having an amplitude of less than about 65 dB during operation thereof.

27. An image forming apparatus having an image forming part for forming an image and an image writing device for writing a latent image to said image forming part, comprising:
   a photosensitive device comprised in said image forming part and holding the latent image thereon;
   a developing device comprised in said image forming part for adhering the latent image with toner;
   a transferring device comprised in said image forming part for transferring the toner to a recording medium;
   a first driving means for driving said image-forming part;
   a second driving means for driving said image writing device;
   a data supply device having at least one moving portion for supplying data to said image forming apparatus; and
   control means for actuating said data supply device within a time period from when said transferring device finishes transferring to when said second driving means fully stops.

28. The image forming apparatus of claim 27 wherein said data supply device is a hard disk device.

29. The image forming apparatus of claim 27 wherein said data supply device is a toner sensor having an oscillator.

30. The image forming apparatus of claim 27 wherein one of said first and second driving means generates noise having an amplitude of about 65 dB during operation thereof, and said data supply device generates noise having an amplitude of less than about 65 dB during operation thereof.

* * * * *